Figure 3:
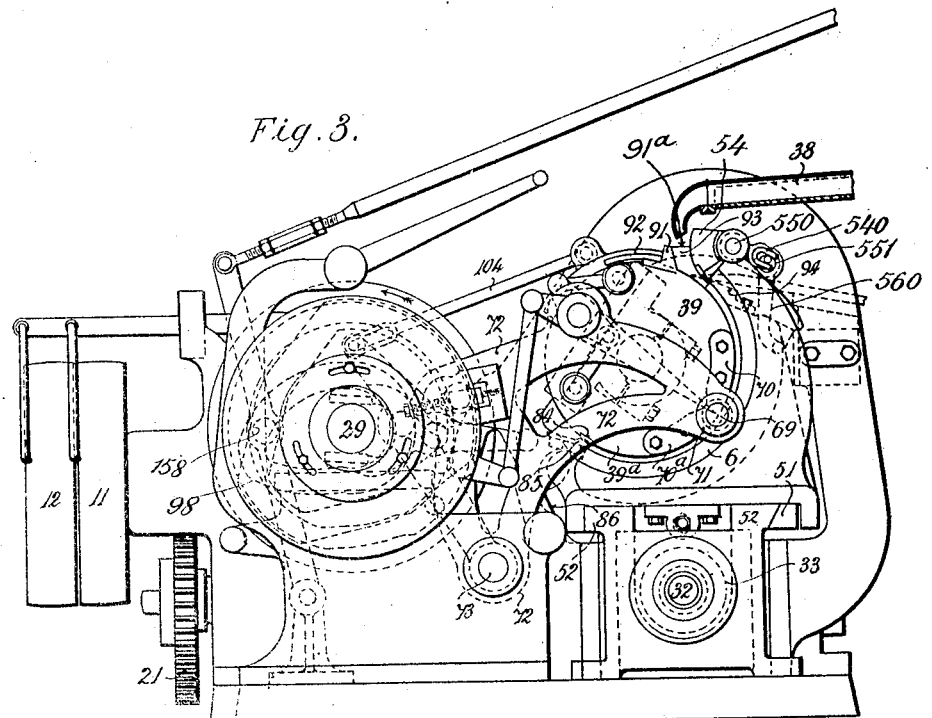

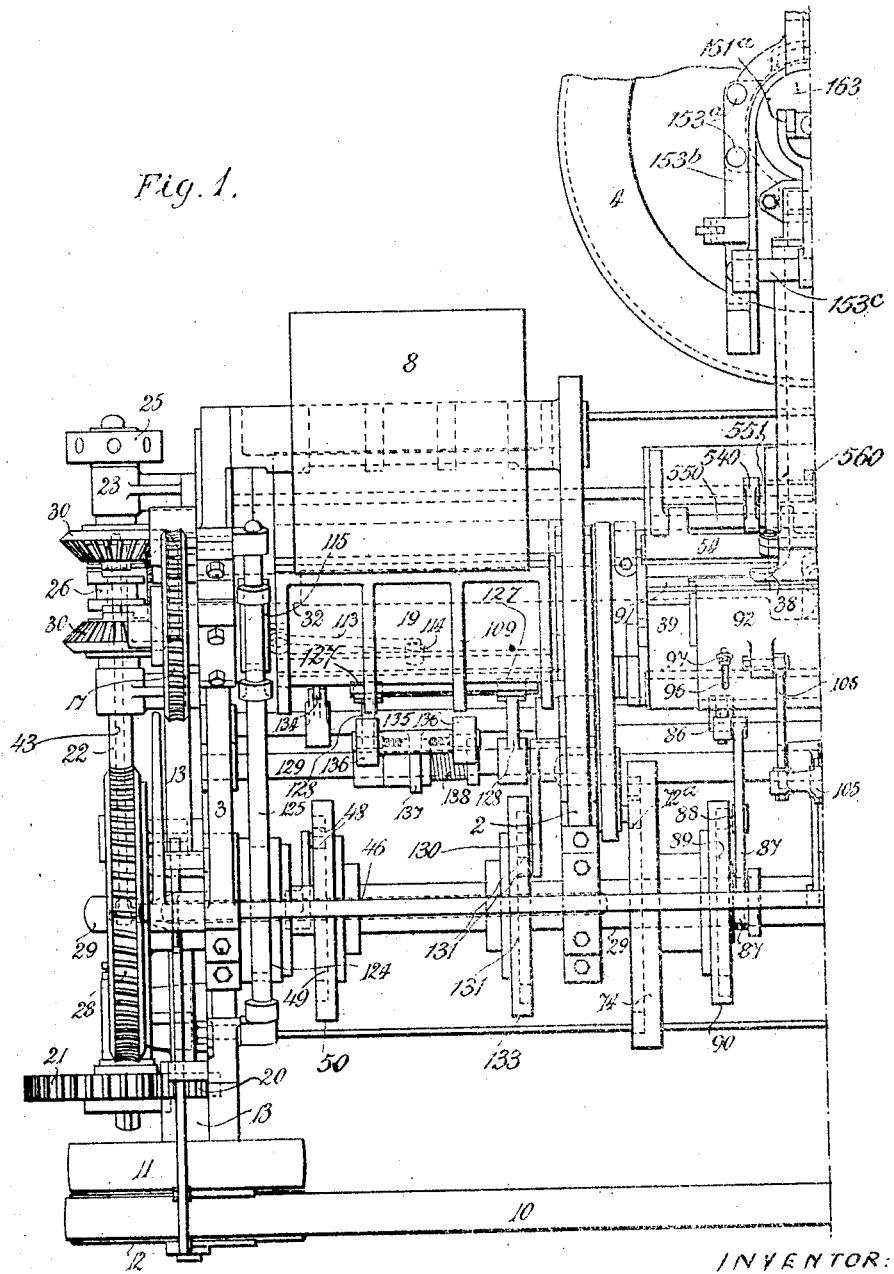

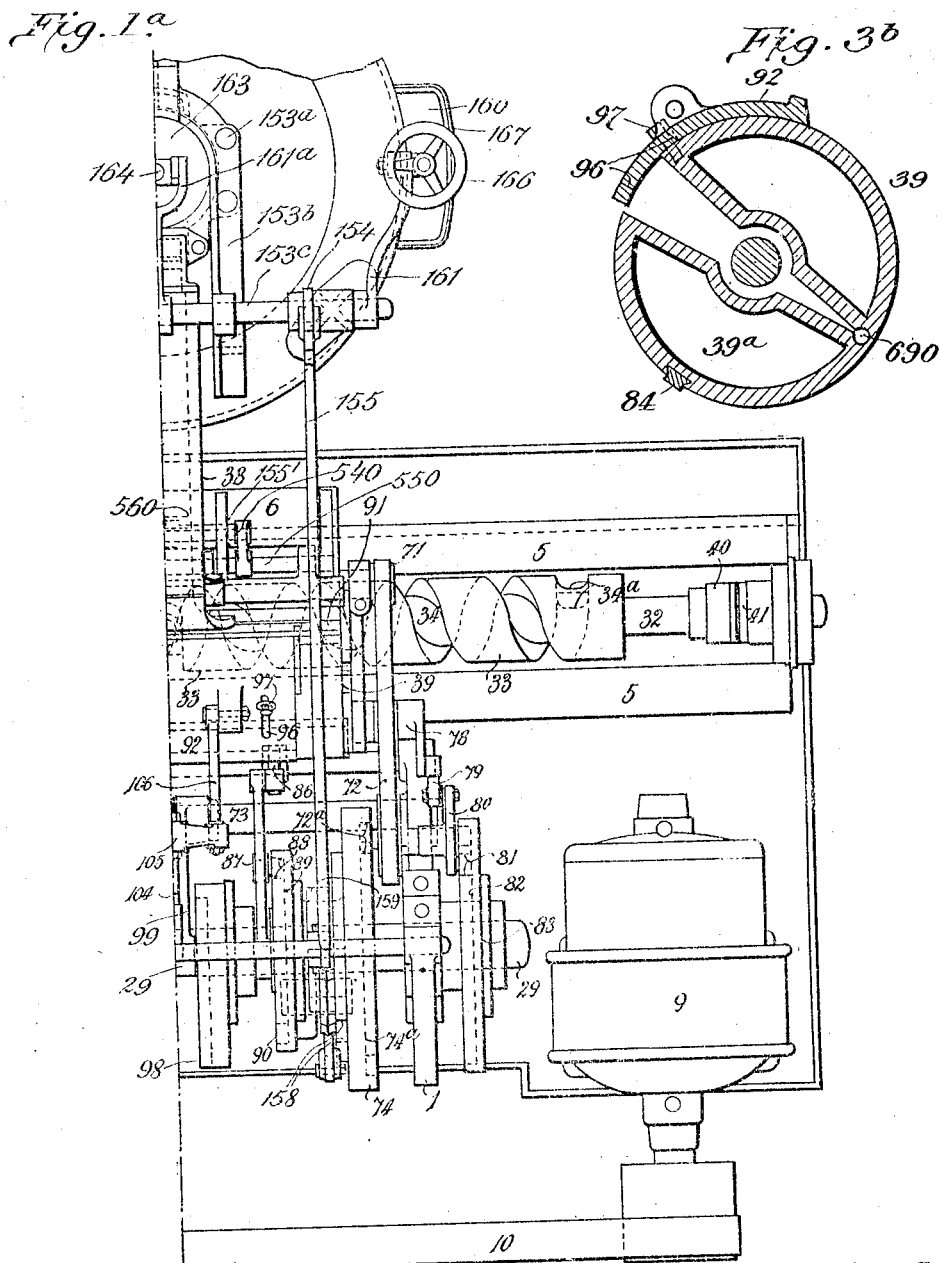

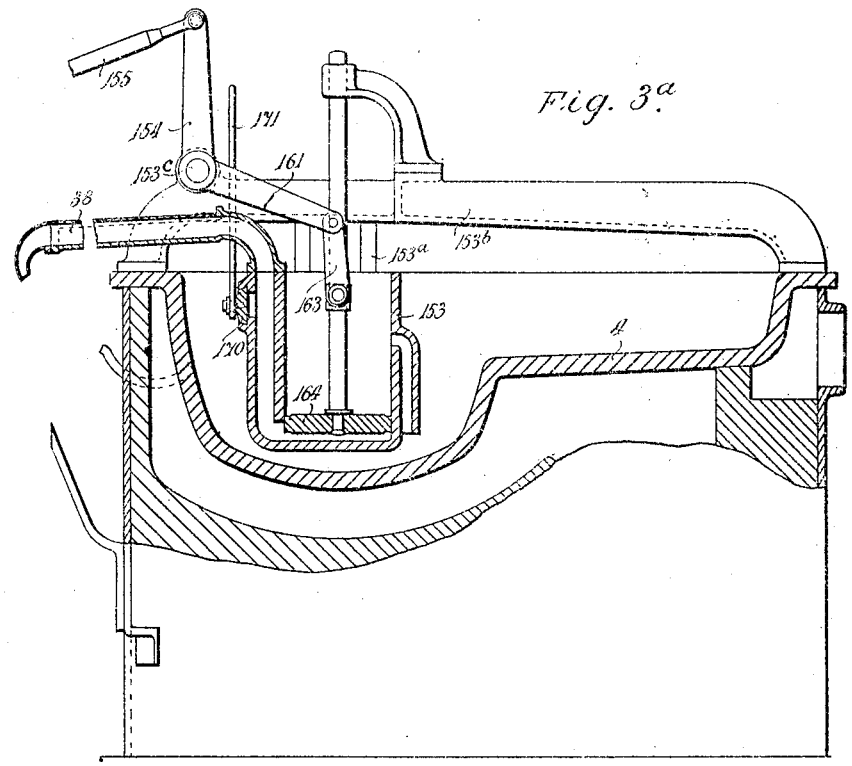
Fig. 3ᵃ
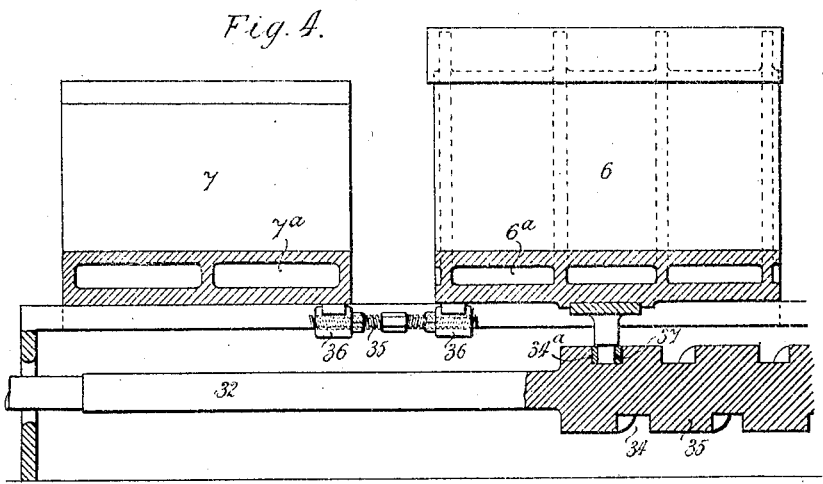
Fig. 4.

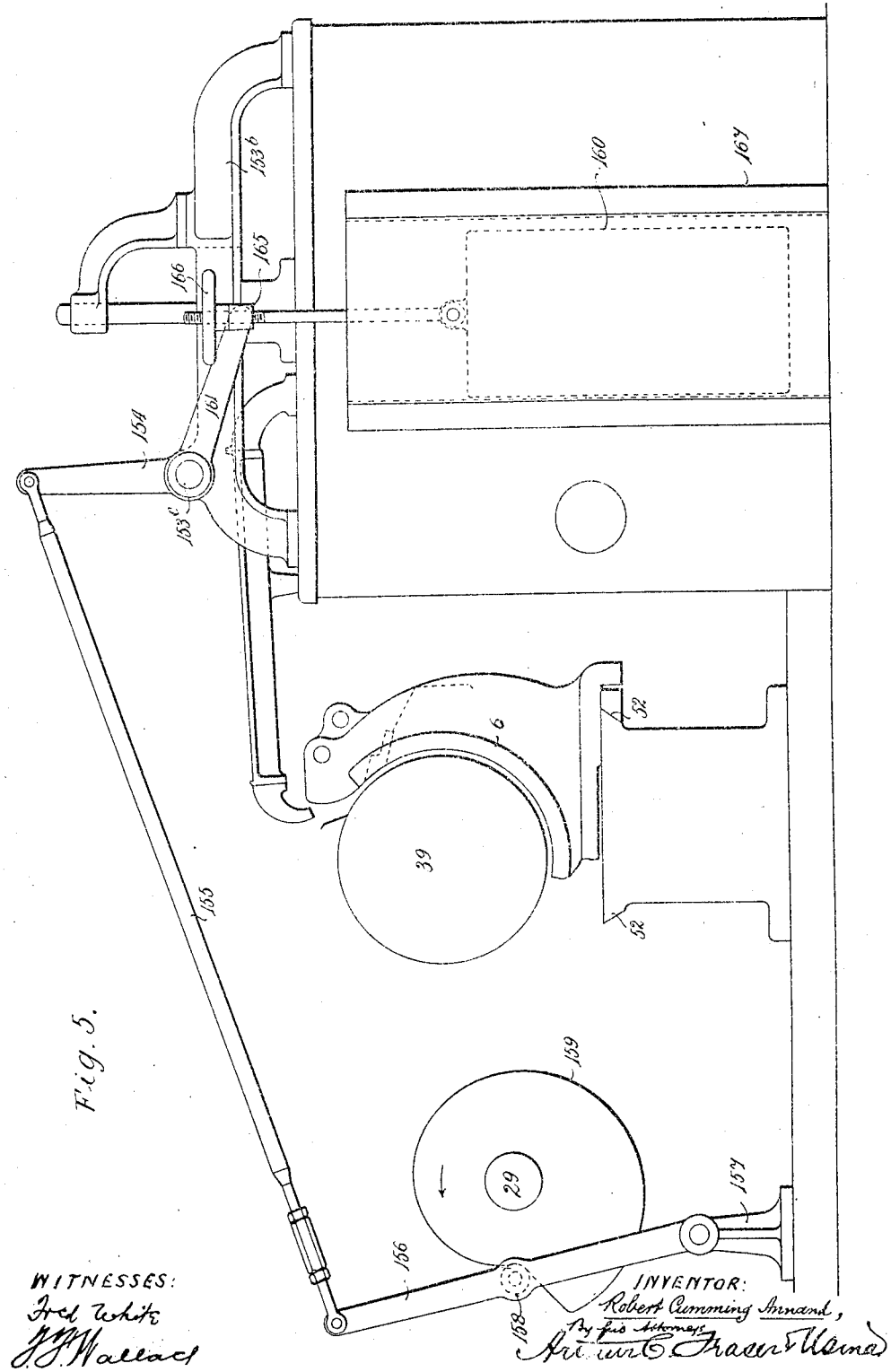

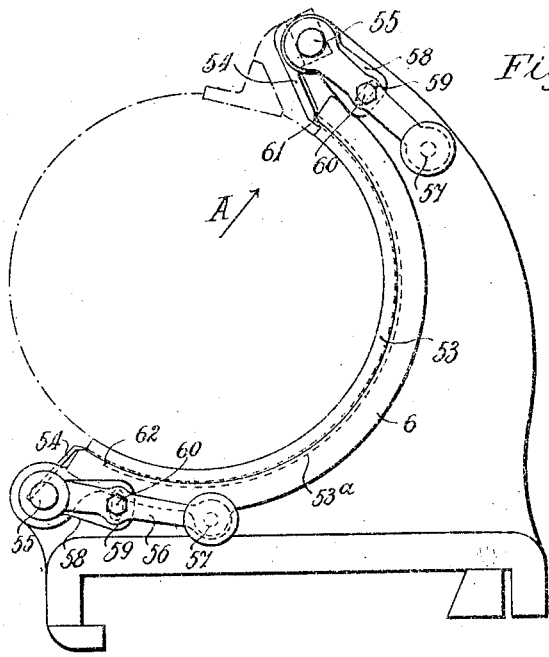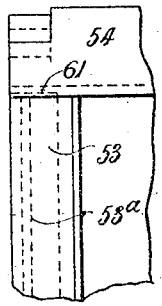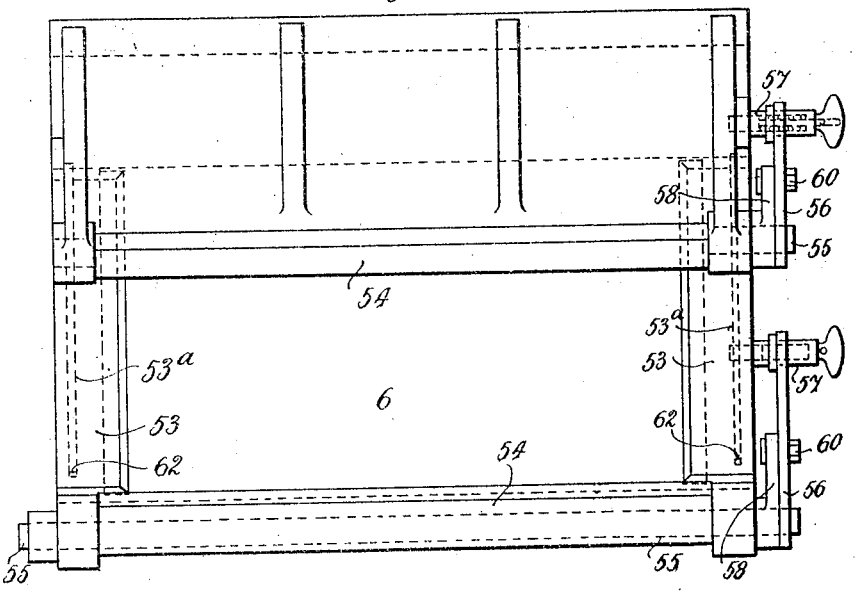

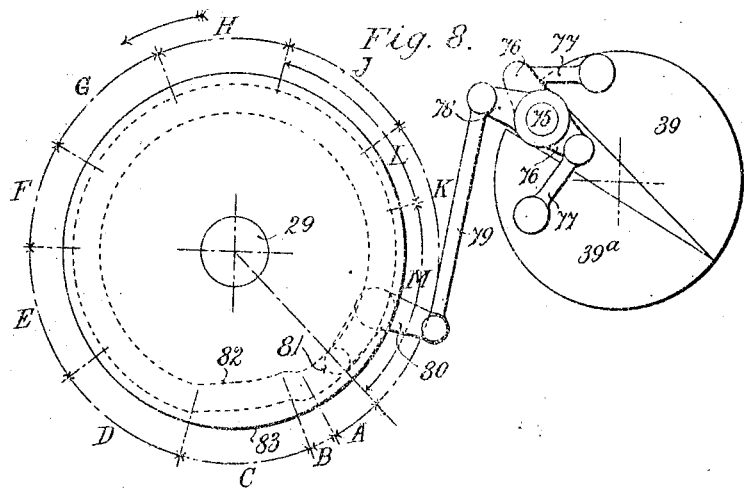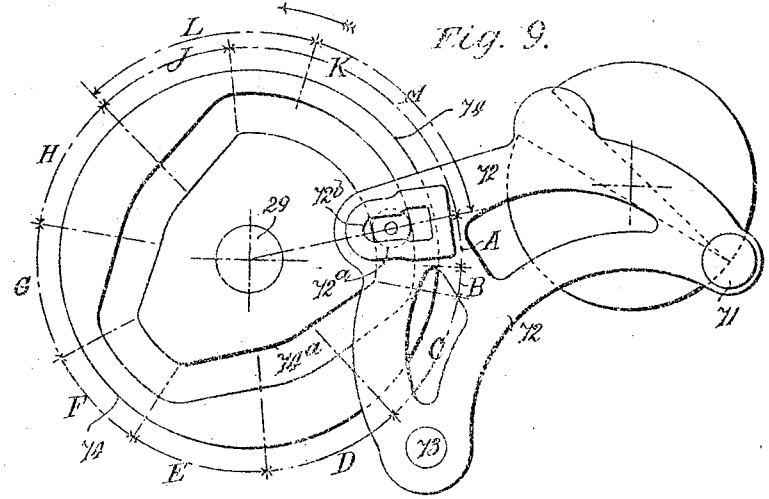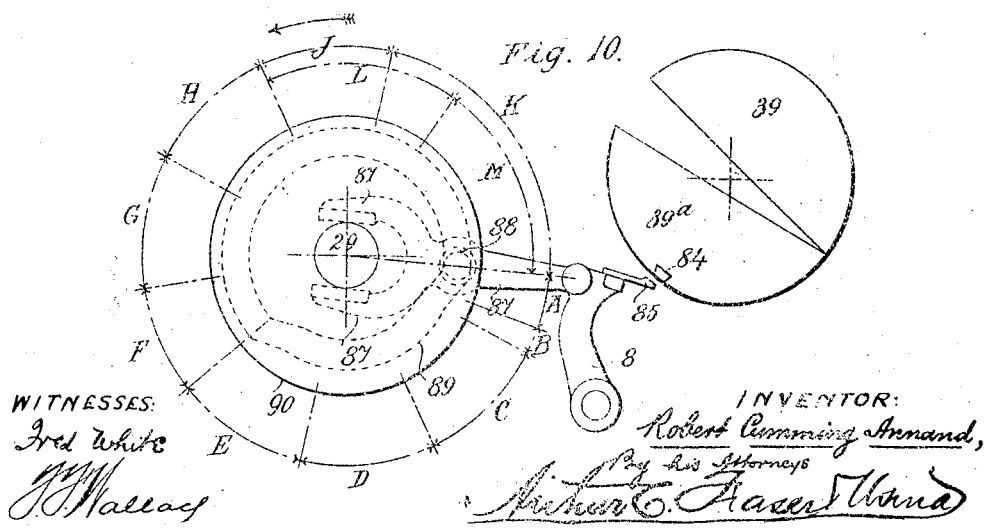

No. 887,373. PATENTED MAY 12, 1908.
R. C. ANNAND.
STEREOTYPING MACHINE.
APPLICATION FILED FEB. 21, 1907.
9 SHEETS—SHEET 3.
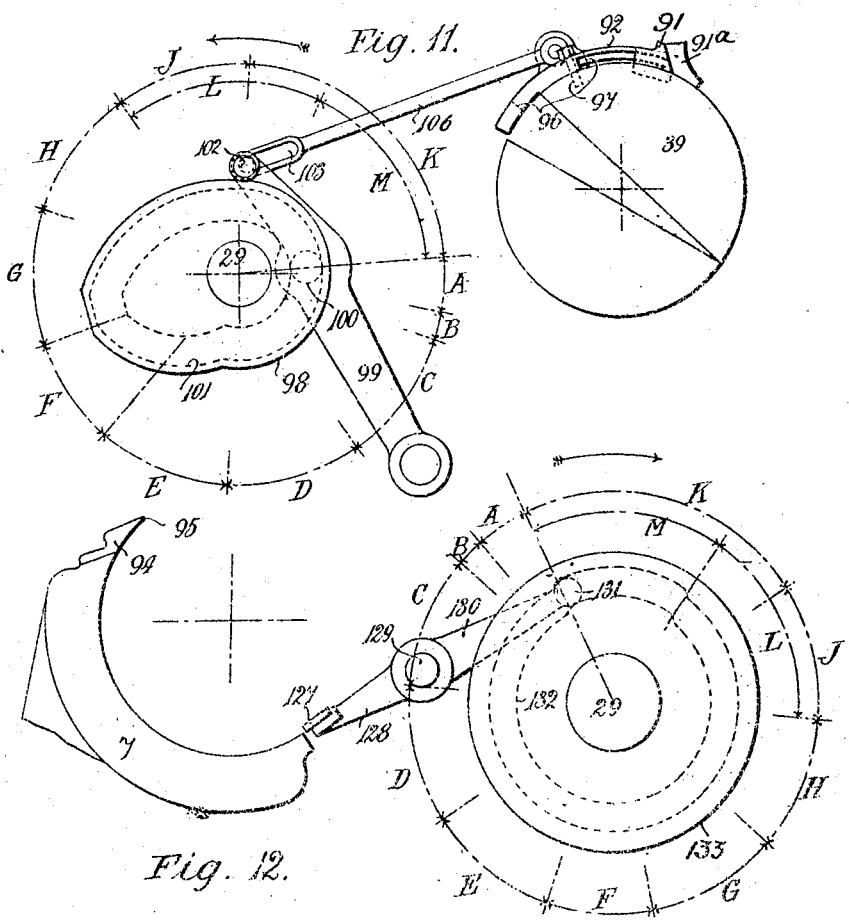
Fig. 11.
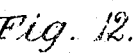
Fig. 12.
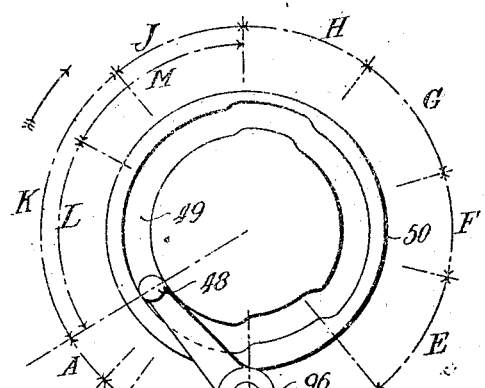
Fig. 13.
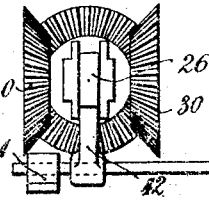

No. 887,373. PATENTED MAY 12, 1908.
R. C. ANNAND.
STEREOTYPING MACHINE.
APPLICATION FILED FEB. 21, 1907.
9 SHEETS—SHEET 9.
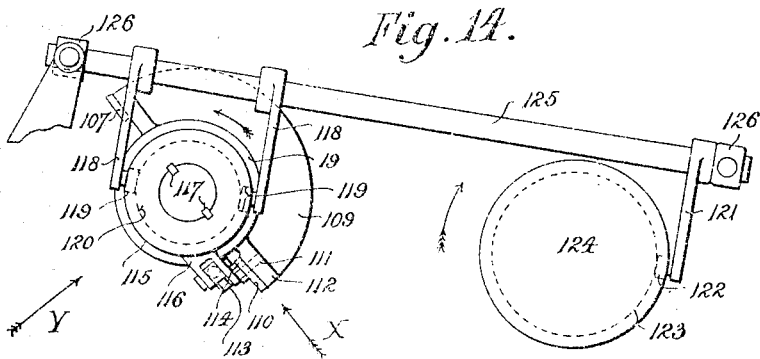
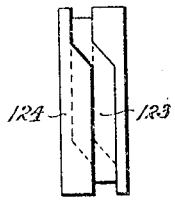
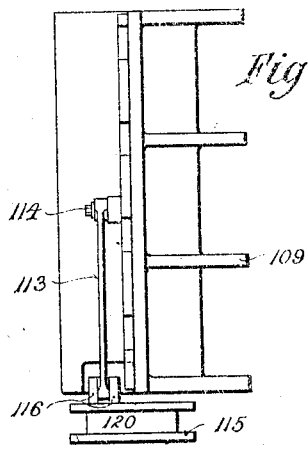
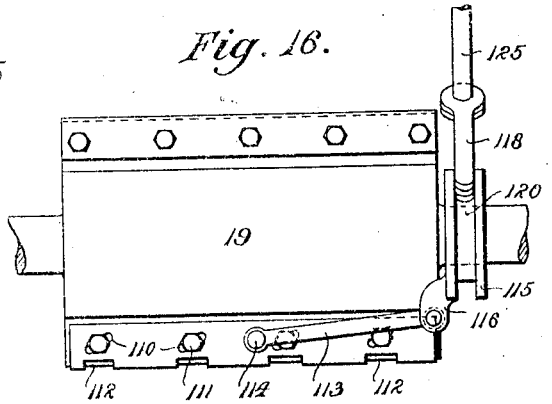
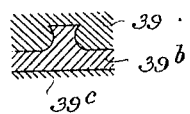
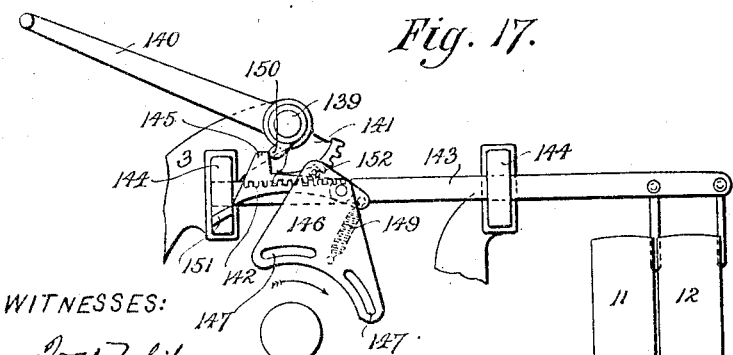
INVENTOR:
Robert Cumming Annand,
By his Attorneys
WITNESSES:

UNITED STATES PATENT OFFICE.

ROBERT CUMMING ANNAND, OF SOUTH SHIELDS, ENGLAND.

STEREOTYPING-MACHINE.

No. 887,373.     Specification of Letters Patent.     Patented May 12, 1908.

Application filed February 21, 1907. Serial No. 358,590.

*To all whom it may concern:*

Be it known that I, ROBERT CUMMING ANNAND, of Cornwallis street, South Shields, Durham, England, printers' engineer, have invented certain new and useful Improvements in Stereotyping-Machines, of which the following is a specification.

This invention relates to apparatus for the production of semi-circular or curved stereotype plates, and aims more particularly to provide improved machinery which shall be capable of rapidly casting and finishing such plates by entirely automatic means.

In apparatus as hitherto employed for producing semi-circular stereotype plates, the practice is to arrange the casting mechanism or devices so that the matrix with the side gages is drawn out of the casting box and attached to the newly cast plate, and the matrix has to be stripped from the plate and re-set in position in the casting box each time a plate is cast. This consumes much valuable time and in the specification of a previous application S. No. 352,695, filed 17th January 1907 I have described a method and means whereby semi-circular or curved stereotype plates can be cast and stripped successively from a matrix kept fixed in a rigid casting box. According to the said method this result is attained by bending the cast plate inwards on the core to allow it to be stripped thereby from the fixed matrix and moving the core and cast plate away from the matrix to effect this stripping operation. The necessary clearance between the core and matrix to permit of thus bending the plates may, as described in the said specification, be created by collapsing the core with the plate attached thereto, or by employing a non-collapsible core and providing means whereby, when the core to which the plate when cast adheres is moved out of the casting box to strip the plate, this latter is temporarily delayed from following its motion. For the purposes of the present invention it is preferred to employ such a method of stripping the plates successively from a fixed matrix, but I do not confine myself to such employment.

The invention comprises a casting box shell and a boring box shell arranged to reciprocate on a slide adjacent to a movable core and apparatus for supplying molten metal to the casting shell, in combination with boring and delivery mechanism for the cast plate, the whole being so arranged and operated, that the casting and boring shell can be brought alternately opposite the core, which first coacts with the casting shell to cast the plate, then moves out with the cast plate and delivers it into the boring shell when this slides to position to receive it, the boring shell then in its return motion carrying the plate to the boring apparatus while the casting shell returns to its position in relation to the core, so that a second plate can be cast while the preceding one is being bored and expelled from the boring shell. In conjunction with such an arrangement it is preferred to employ devices whereby the straight and circular edges of the cast plate are respectively trimmed during the return travel of the boring shell from the core and the delivery motion of the plate.

The invention also comprises the combination with such arrangement of a shaft set parallel to the slide on which the casting and boring shells travel, and carrying a series of cams whereby the core and some or all of the other machine elements involved in the casting and manipulation of the plate are operated and controlled.

The invention also comprises in combination with an arrangement of the character mentioned and wherein a collapsible core is employed, a parallel cam shaft disposed as above stated and carrying cams adapted respectively to collapse and expand the core, withdraw a bar by which the bottom of the casting space is closed, raise and lower the core into and from the casting and boring shells, operate a device for breaking off the jet, actuate a device for stripping the plate from the core into the boring shell, operate a device for expelling the bored plate from the boring shell and control the operation of a pump to supply the metal to the casting shell. The said cam shaft may also carry a cam for effecting the reversal of the sliding movement of the casting and boring shells.

The invention further comprises the employment in apparatus for casting and boring curved stereotype plates, of a core adapted to move into and out of a casting shell and a boring shell alternately for casting a plate and transferring the same from the casting shell into the boring shell, in combination with a moving member or mouthpiece component on the core and means for projecting the same against the jet when the core has posited the plate in the boring shell, so as to break off the jet over the edge of the boring shell.

The invention comprises certain further improvements which will appear from the following description.

The manner in which the invention can be carried into effect will be understood from the following description by way of example of a machine embodying the same, reference being had to the accompanying drawings in which,—

Figure 2:
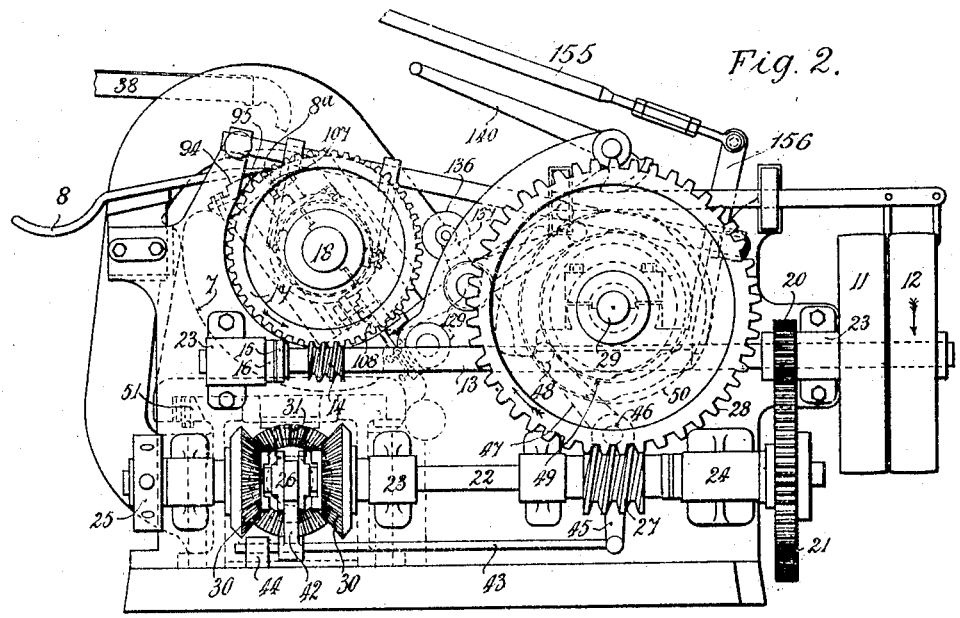

Figures 1 and 1$^a$ are respectively left and right hand portions of a plan view of the machine, including a melting pot, furnace and pump and an electric driving motor. Fig. 2 is an end elevation looking on the delivery end of the machine. Figs. 3 and 3$^a$ are left and right portions of an elevation of the other end of the machine with the motor omitted, and the melting pot and pump in section. Fig. 3$^b$ is a detail section of the core. Fig. 4 is a sectional elevation of the casting and boring shells, illustrating the means for connecting them together and imparting the reciprocation to them. Fig. 5 is a detail side elevation of the machine from the same end as Figs. 3 and 3$^a$, illustrating the metal pumping mechanism. Figs. 6 and 7 are detail views in side elevation and plan illustrating the preferred means for clamping the matrix in the casting shell, and Fig. 7$^a$ is a part face view looking along A Fig. 6. Fig. 7$^b$ is a detail section illustrating the manner in which the grooves on the core are cut to retain the cast plate thereon and permit it to be stripped from the core into the boring shell. Figs. 8 to 13 are separate diagrammatic views showing the various cams which control the different parts of the machine together with the parts they respectively operate. Fig. 8 illustrates the cam and mechanism for collapsing and expanding the core. Fig. 9 illustrates the cam and mechanism for raising and lowering the core at the proper times from and into the casting and boring shells. Fig. 10 shows the cam and mechanism for controlling the movements of the stopper bar which closes the bottom of the casting mold. Fig. 11 shows the cam and mechanism for automatically breaking off the jet of the plate after this has been deposited in the boring shell. Fig. 12 shows the cam and mechanism for operating the stopper bar against which the plate buts while being bored and the position of the boring shell relatively to this bar during boring. Fig. 13 shows the cam and reversing gear for the spirally grooved drum which moves the casting and boring shells to and fro under the boring knife and core. Figs. 14, 14$^a$ are detail views showing the cam and mechanism for controlling the driver bar on the boring cylinder whereby the finished plate is turned round on the boring cylinder and delivered on to the table. Figs. 15 and 16 are detail views looking in the direction of arrows X and Y respectively (Fig. 14) and illustrating the mechanism for operating the driver bar 108 under the action of the cam 124. Fig. 17 is a detail view illustrating the starting and automatic stopping gear.

To facilitate the following description I will shortly summarize the action of the machine illustrated. The matrix having been fixed in the casting shell and the machine started, the casting shell slides to position opposite the spout of the melting pot, the core descends into the casting shell and the pump is operated to supply the metal to the mold, and the machine stops. When the plate is sufficiently set the machine is started, the core strips the plate from the matrix and rises with it out of the casting shell, the casting and boring shells slide along until the boring shell comes under the core, which descends and deposits the plate in the boring shell. The jet is broken off over the top of the boring shell. The core rises and the casting and boring shells slide back to bring the casting shell again opposite the spout and the plate in the boring shell under the boring trimming and delivery mechanism. While these are dealing with the cast plate the pump is operated to cast the next plate, and so on.

1, 2, 3 are the main frames of the machines which comprises a melting pot 4 disposed about midway of its length. At the lower part of the machine is mounted a slide 5 extending for its length and upon this slide the casting and boring shells 6 and 7 which are connected together as described later. 8 is the delivery table and 9 the motor. The frame 3 carries all the main driving gear which receives its motion from the driving belt 10 running on the fast and loose pulleys 11 and 12 respectively. The main driving shaft 13 is cut with a worm 14 at the opposite end from the driving pulleys and has a shoulder 15 which buts against ball thrust bearings 16. The worm 14 gears with a wheel 17 keyed to the trunnions 18 of the boring and delivering cylinder 19, so as to drive this always in one direction. On driving shaft 13 is mounted a gear wheel 20 meshing with a gear wheel 21 on the countershaft 22. Shafts 13 and 22 are supported in bearing brackets 23, 23, 24 of which 24 may be adjustable longitudinally for wear.

Keyed on shaft 22 are a capstan 25, a sliding clutch 26 and a worm 27. The latter drives a worm wheel 28 fixed on a cam shaft 29 mounted parallel to the slide 5 and carrying the various cams which control the operations of the different parts of the machine.

Loose on shaft 22 are miter wheels 30, 30 meshing with a miter wheel 31 keyed on the through shaft 32 of a drum 33. The shaft 32 is mounted below the slide 5 and extends the whole length of the machine. The drum 33 is formed with a spiral groove 34. The reciprocating travel is imparted to the casting and boring shells 6 and 7 on the slide 5 by the drum 33. During the operation of the machine the clutch 26 is slid into gear with the miters 30, 30 alternately, under the action of a cam on the cam shaft 29, and thus the drum 33 is driven alternately in opposite directions to drive the casting and boring shells to and fro on the slide 5.

Referring to Fig. 4, the casting shell 6 and boring shell 7 are formed with jackets $6^a$ and $7^a$ for the circulation of water or other cooling medium and are coupled together by a rod 35 with right and left handed threads working in nuts 36 secured to the casting and boring shell respectively, whereby adjustment is provided to secure the correct relative positions of the shells.

The drum 33 with spiral groove 34 extends about half the length of the machine and the bottom of the casting shell carries a roller 37 working in the groove 34, so that as the drum 34 rotates in alternate directions, the casting and boring shells are driven alternately in opposite directions and come in turn opposite the melting pot spout 38 and core 39, which are located at about the middle of the machine and the boring shell comes alternately opposite the boring knife on its cylinder 19. The groove 34 has a plain circular portion $34^a$ at each end so as to insure that the shells 5 and 6 shall come accurately to their end positions without shock. The drum 33 is adjustable longitudinally to take up wear by means of nuts 40 at each end, the thrust of which is taken by ball bearings 41 at the ends of the slide 5.

The sliding motion of the clutch 26 to engage the miters 30, 30 alternately is imparted by a fork 42 (Figs. 2 and 13) fast on a rod 43 sliding in a bracket 44 and connected to an arm 45. This arm has a rigid connection to the shaft 46 mounted in the frames 2 and 3 and through it to the arm 47 which carries a roller 48 working in a groove 49 of the cam 50 (see Fig. 13).

The casting and boring shells 6 and 7 are approximately semicircular castings properly faced to run on the slide 5 and provided with gibs 51 working on corresponding guide surfaces 52 at the sides of the slide. They are set in a tilted position as shown with their backs to the melting pot and their concave faces towards and parallel to the cam shaft 29.

The matrix is permanently clamped in the casting shell for the whole run. For this purpose it is preferred to employ the matrix clamping arrangement illustrated in Figs. 6, 7, $7^a$. Referring to these figures, 53, are loose side gages disposed in the casting shell 6 these being adapted to suitably overlap the matrix at the sides and being inserted in the shell 6 by a semicircular feather $53^a$ with which they are each formed, said feathers fitting in grooves in the shell and preventing the side gages from slipping out when released. The top and bottom edges of the matrix are clamped by rocking grippers 54, 54, mounted on spindles 55, 55 controlled by hand levers 56, 56. The hand levers are locked in the matrix clamping position by spring plungers 57, 57 on the ends of the hand levers and each adapted to engage in a suitably positioned hole in the shell 6.

In order that the grippers may always hold the matrix firmly, an adjustment is provided whereby the angular position of the plunger relatively to the gripping edge may be varied to cause said edge to bear more or less on the matrix. This adjustment in the case of both grippers consists of an arm 58 keyed to the respective spindle 55 and formed with segmental slots 59. The bosses of the hand levers encircle the spindles 55 and the hand levers are adjustably secured to the arms 58 by bolts 60 passing through the slots 59. To adjust the gripping pressure on the matrix, the plunger 57 is engaged in the hole in the shell, the bolt 60 is loosened the pressure is adjusted and the bolt tightened up. The top gripper 54 also serves to clamp the side gages 53 and hence the side edges of the matrix in position, by means of a projecting edge 61 of the same thickness as the matrix, formed on the upper edge of each side gage and which therefore abuts against the top gripper when this is turned to clamping position. The lower ends of the grooves in the shell for the feathers $53^a$ are undercut as indicated at 62 and the feathers are shaped to correspond, and by this means together with the gripping of the projecting edges 61 the side gages are prevented from springing in with the newly cast plate when the core is collapsed as described later.

The matrix clamping arrangement shown in Figs. 1 to 3 differs slightly from that just described in that the top gripper 54 is arranged to be swung into and out of the position in which it clamps the matrix and side gages, by means of forks 540 (Figs. 1, $1^a$ and 3) attached to the spindle 550 on which the gripper 54 is mounted, the forks being operated by an eccentric rod 551 by means of a handle 560, so that when this handle is thrown over, the gripper is rocked into and out of its clamping position. This is a similar arrangement to that adopted in my said prior specification. In other respects the arrangement of the gages and clamping mechanism is as before described with reference to Figs. 6, 7, $7^a$.

The core 39 is arranged to be collapsed to enable the cast plate to be stripped by it from the fixed matrix. It is composed of two hollow semi-cylindrical segments 39, $39^a$ hinged together at each side by hinge or stud pins 69 and provided at the hinge joint with registering grooves 690 (Fig. 3ᵇ) for the reception of asbestos packing. The hinges consist of members 70, 70ᵃ bolted to the respective segments and having semicircular bearing surfaces embracing the hinge studs 69 which project through bosses 71 of the rocking levers 72 which oscillate about the center of a shaft 73 mounted in the frames 1 and 2. These rocking levers are controlled by a pair of cams 74, 74 (see Fig. 9) on the cam shaft 29 by rollers 72ᵃ working in grooves 74ᵃ of the cams 74. The function of the rocking levers 74 is to move the core into and out of the casting and boring shells at the proper times. The rollers 72ᵃ are adjustable with respect to the levers 72 in slots 72ᵇ.

The core is collapsed and expanded at the proper times by mechanism as follows:— 75 is a shaft journaled in the rocking levers 72 upon which bell cranks 76 are keyed at each side of the core between same and the rocking levers. The arms of these bell crank levers are connected respectively to the core segments by links 77, which may encircle eccentric bushes supported by studs in the core so as to provide adjustment for wear. One end of shaft 75 projects through the outside rocking lever 72 (the right in Fig 1ᵃ) and upon it is secured an arm 78 connected by a link 79 to a bell crank 80 supported by the rocking lever 72 (see Figs. 1ᵃ and 8). Bell crank 80 carries a roller 81 running in the groove 82 of a cam 83 on cam shaft 29 and which controls the motions of the described mechanism for opening and closing the core. The rocking motion of the roller 81 due to the oscillations of the rocking levers 72 does not affect the proper operation of the opening and closing of the core, as the tangent of the middle point of the arc, described by the center of the roller, is also a tangent to the middle line of the concentric portion of the cam groove, that is to say an imaginary line running round the middle of the concentric portion of the cam groove.

The core is formed with parallel grooves as usual into which the metal runs to form the ribs on the inner face of the plate, but these grooves are slightly undercut at the bottom and rounded at the shoulders as illustrated in Fig. 7ᵇ, in which 39 designates the core, 39ᵇ the cast plate and 39ᵈ the matrix; in this way the cast plate will adhere sufficiently to the core to be bent inwards thereon when the core is collapsed to strip the plate from the matrix.

The bottom of the casting space between the core and matrix is closed at the proper times by two coacting bars 84, 85. Bar 84 is dovetailed into the core, while bar 85 is secured to rocking arms 86, 86 (Figs. 1, 1ᵃ, 3 and 10) to which are linked forked levers 87, 87, the forks of which slide on the cam shaft 29. The levers 87 carry rollers 88 working in the grooves 89 of cams 90 on the cam shaft. Reciprocating motion is thus imparted to the levers 87 and thus the stopper bar 85 is caused to rock towards and away from the cam shaft 29. The function of the stopper bar 85 is two fold, firstly it rocks into position against bar 84 to close the casting space when the core has moved into the casting shell, and secondly when the core has stripped the plate from the matrix and descends with it into the boring shell when this has slid into position, the bar 85 rocks into position against the lower edge of the cast plate and acts to strip it from the core into the boring shell.

The pouring mouthpiece at the top is completed by two fixed pieces 91 on the respective ends of the core and to which are screwed the ends 91ᵃ and an intermediate sliding member 92, the fixed pieces 91 having screwed to them the lateral end pieces 91ᵃ which close the sides of the pouring mouthpiece. The sliding member 92 has another function explained later. The front faces of 91 and 92 are inclined and are in alinement in the casting position of the parts, thus forming the inner wall of the mouthpiece 93, Fig. 3. The boring shell 7 is of similar form to the casting shell and is lined with zinc. At top of its cast iron body is bolted a steel bar 94 which completes the semicircular receptacle and is formed with a strong sharp edge 95 extending the length of the plate and over which the jet is broken off when the core delivers the plate into the boring shell.

The jet is broken off by the member 92 before mentioned, which conforms to the shape of the core 39 and slides thereon, being guided between the end pieces 91 and intermediately by slots 96 working over studs 97 on the core 39, Figs. 1, 1ᵃ and 11. The operation of the member 92 to retain it in alinement with the end pieces 91 for casting and slide it forward against the jet to break this off over the edge 95 of the boring shell, is controlled by a cam 98 on cam shaft 29 as follows (Figs. 1, 1ᵃ and 11).

99 is a lever mounted on shaft 73 as a fulcrum and guided by a roller 100 working in the groove 101 of the cam 98. The top end of lever 99 carries a pin 102 working in the slot 103 of a connecting link 104 attached by an adjustable cross head 105 (Fig. 1, 1ᵃ) to links 106, 106 which in turn are connected to the sliding breaking wedge 92. For simplicity, the crosshead 105 and links 106 are omitted in Figs. 3 and 11 and the link 104 is shown as connected direct to the sliding member 92.

The usual edge tools for trimming the straight edges of the plate in the boring shell are attached to the frame 2 over the path which these edges traverse as the boring shell slides to the boring position, so that as the boring shell slides into the boring position these tools trim the straight edges of the plate. This is a common arrangement and will be understood without further illustration.

The boring and delivering cylinder 19 in its general arrangement is similar to that described in my said previous application. It is mounted in the frames 2 and 3 and is driven in a constant direction by the worm wheel 17 as described. It carries a boring knife 107 and an automatically retractable driver bar 108 at opposite sides (see Fig. 14) and is formed with segmental ribs 109 which strengthen it and serve to support the plate during trimming of its circular edges and delivery. The cylinder 19 is located over the position into which the boring shell 7 slides with the cast plate, and is concentric with the boring shell. During the time the boring shell is sliding with the plate to position under the boring and delivery cylinder 19, the boring knife is describing a semi-circle clear of the plate and the driver bar 108 is kept retracted so that it clears the plate in the boring shell. When the plate is in the boring position the boring knife 107 describes its operative semi-circle and bores the plate i. e. shaves the ribs cast on its inner face, the driver bar 108 being meanwhile projected as about to be explained so that in the succeeding half revolution of cylinder 19 it comes against the lower edge of the plate and drives it round before it out of the boring cylinder 7 and on to the ribs 109 for delivery.

The driver bar 108 extends the length of the boring cylinder and is guided in its projection and retraction by inclined slots 110 in it working over bolts 111 by which it is attached to the wing 112 of the cylinder. A link 113 is connected at one end to a driver bar 108 by a stud 114 and at the other end to a guide 115 having projecting lugs 116 to take the end of the link. The guide 115 slides to and fro in the direction of the cylinder axis on two bed keys 117 being actuated by two levers 118 with rollers 119 working in a circumferential groove 120 of guide 115. Levers 118 are similar to a lever 121 the roller 122 of which works in the groove 123 of a cam 124 (Fig. 14ª) on cam shaft 29. The levers 118, 121 are fixed on a shaft 125 located in eyes 126 secured to the frame 3. Thus by the action of the cam 124 the guide 115 and links 113 are slid to and fro in the direction of the axis of the cylinder 19 and the driver bar 108 is projected and retracted at the proper times.

While the boring knife 107 is boring the plate this is prevented from sliding out of the shell 7 by a bar 127 which is moved against its lower edge at the proper time and immediately the knife leaves the plate this bar 127 is moved down clear of the path the plate will take in being driven round out of the shell by the driver bar 108 These movements of the bar 127 are effected as follows (Figs. 1 and 12). The bar is carried by two arms 128 keyed to a shaft 129 mounted in frames 2 and 3 and rocked by an arm 130 carrying a roller 131 working in the groove 132 of a cam 133.

When the boring is completed, the bar 127 moves away from the plate and the driver bar 108 comes against the upper edge of the plate and drives it round before it on to the ribs 109 of the boring cylinder for delivery. In this rotating movement the curved edges of the plate are trimmed in the known way by adjustable cutters 134 mounted on a shaft 135 supported in the frames 2 and 3, one of these cutters is shown in the figure, the other being identical.

To prevent the plate from falling from the boring cylinder while being delivered, there are two wooden rollers 136 (Figs. 1 and 2) supported by an arm 137 pivoted on the shaft 129 and subject to the action of a winding up spring 138, which tends to keep the rollers 136 up to the surface of the plate. Rollers 136 are covered with stereo blanketing.

The machine stops automatically just after the finished plate is clear of the boring shell, the plate is not delivered on to the table 8 till the machine is started on a second cycle. If it should be required to lift the finished plate from the machine before its final delivery the rollers 136 can be raised by hand and the plate removed.

The machine is automatically stopped with a finished plate ready for delivery and the next one cast in the mold, by the following mechanism illustrated in detail in Fig. 15, where it is shown in the stop position. 139 is a shaft journaled in the frames 1 and 3 on which are keyed at any convenient points any desired number of hand levers 140, for starting or stopping; one lever is shown. Keyed on shaft 139 outside frame 3 is a toothed quadrant 141 meshing with a rack 142 on the rectangular striking lever 143 sliding in brackets 144 on frame 3. 145 is a latch pivoted on a plate 146 fastened to the worm wheel 28 and adjustable thereon by slots 147. The latch thus rotates with the worm wheel. By means of a spring 149 it is kept projected so as, in its revolution, to engage a trigger 150 keyed to shaft 139 and thereby at the proper moment turn the shaft 139, whereby the quadrant 141 moves the striking rod 143 to throw the belt on to the loose pulley 12. While engaging the trigger 150 the latch 145 is prevented from being depressed by a projection 151 on the bracket 144. In the stop position the latch is just clear of this projection. A stop 152 on the plate 146 prevents the latch rising too high under the action of its spring. When the operator throws over the hand lever to start the machine on the next cycle, the latch and trigger move clear so that the latch can rotate with the plate 146.

The metal is supplied from the melting pot to the casting box by a pump of usual construction operated by the descent of a weight (Fig. 5). The pump cylinder 153 is suspended by studs 153ª from a framework 153ᵇ mounted on the melting pot 4. The pump is operated at the proper period by mechanism as follows (Fig. 5). 153ᶜ is a shaft mounted in the framework 153ᵇ and rocked by an arm 154 keyed thereon and connected by a rod 155 of adjustable length to a lever 156 pivoted on a bracket 157. Lever 156 carries a roller 158 working on a snail cam 159 clamped to the cam on cam shaft 29. 160 is a weight suspended from a lever 161 keyed to the shaft 153ᶜ. The pump piston receives motion from shaft 153ᶜ through forked lever 161ª keyed thereon and connected by links 163 163 to the piston 164. The operation of the pump is thus controlled by the cam 159 which through the lever 156 and the described connections lifts the piston against the action of the weight 160. When the step of cam 159 reaches the rollers 158 the weight is released and falls, forcing down the piston and discharging the metal from the pump cylinder through the spout 38 into the casting box. The weight strikes the ground at the end of the down stroke, which can be regulated by screwing the weight up or down in its suspension eye 165 by a handwheel 166. The weight 160 is guided in a casing 167.

All the cams which control the motions of the machine as described are mounted on bosses keyed to the cam shaft 29 and are adjustable relatively to the bosses in the manner shown in Fig. 3 with respect to cams 74, 74, viz., by bolts and slots 168, 169.

The operation of the machine is as follows, starting from the commencement of the cycle. Supposing a newly cast plate to have sufficiently cooled the machine is started by a hand lever 140. The stopper bar 85 which closes the casting space, immediately, under the action of the cams 90, moves clear of the motions of the plate. Then the segments 39, 39ª of the core close under the action of cam 83 bending the plate inwards with them and stripping it from the fixed matrix at all points except along a line at the hinge center. The core now rises with the plate under the action of cams 74, 74 and rocking levers 72, 72, so that the casting and boring shells 6 and 7 are free to slide under the action of the spirally threaded drum 33, which immediately drives them to the right, bringing the boring shell 7 to position under the raised core. The core now under the action of the cams 74 descends with the plate into a position concentric with the boring shell 7, the segments having been previously expanded again under the action of cam 83, and while the plate is between the core and boring shell the breaking wedge 92 slides forward against the jet of the plate under the action of cam 98, and breaks off the jet over the steel edge 95. The core again rises, and as the stopper bar 85 has been meanwhile removed by the cams 90 into position to engage the bottom edge of the plate, this is stripped from the core into the boring shell, the top part of the plate having been loosened by the action of the breaking off wedge. The shells 6 and 7 slide back to the left to bring the boring shell 7 under the boring and delivering cylinder 19 and the casting shell 6 opposite the spout 38. During this traverse the boring knife 107 will be describing a semicircular arc clear of the plate, the driver bar 108 will be kept retracted clear of the plate by the cam 124 (Figs. 14, 14ª) and the stopper bars 85 and 127 will be kept by their respective cams 90 and 133 in a suitable position to prevent the plate sliding out of the boring shell by gravity. During this traverse of the shells 6 and 7 also the straight edges of the plate are trimmed as explained. Immediately the shells come to position as described the knife 107 begins to bore the plate, the stopper bar 127 remaining in position to hold the plate until the boring is complete, when it immediately moves down and at the same time the driver bar 108 is projected and comes against the upper edge of the plate, which it drives round before it on to the ribs 109 of the boring cylinder 19, where it is held ready for delivery by the rollers 136, the curved edges being trimmed by the tools 134 as the plate rotates. The machine then stops automatically under the action of the mechanism of Fig. 15. Meantime a new plate has been cast and is cooling. During the early portion of the boring operation the core has moved down into the boring shell and expanded, the cam 159 then allowing the pump weight 160 to fall and force the proper quantity of metal into the mold. When the new plate is sufficiently set the machine is started on a new cycle, the finished plate being delivered on to the table 8, on to which it is guided by the projecting edge 8ª, Fig. 2. As the plate leaves the ribs of the cylinder 19 before being clear of the rollers 136 these yield to the movement of the plate while still pressing on its surface.

When the required number of plates have been cast, the pump supply is diverted into the melting pot 5 by a sluice 170 (Fig. 3ª) operated by a hand lever 171 through suitable linkage so that the machine may complete and deliver the last plate without pumping a new supply of metal into the mold.

In order to facilitate an understanding of the relative action and timing of the various cams to cast and manipulate the plate, a circle is described round each of the cams shown separately in Figs. 8 to 10 and 11 to 13, these circles being divided into arcs A _____ M. The cams are shown with the grooves in the positions they occupy relatively to their rollers at the beginning of the cycle. The lettered arcs are supposed to revolve with the cams, and when the roller is moving in any given segment, reference to the following table will give information as what is taking place in other parts of the machine at the time.

*Start.*

A. Casting shell stopper bar 85 moves out.

B. Segments of core are drawn together.

C. Core rises with plate out of casting shell.

D. Casting shell 6 slides away to bring boring shell 7 under core.

E. Core descends and deposits plate in boring shell and stopper bar 85 moves in again.

F. Breaking wedge 92 breaks off jet.

G. Core rises again.

H. Boring shell 7 carries plate under boring cylinder 19 and casting shell moves back to casting position.

J. Core descends into casting shell for next cast.

K. Pump operated, new plate cast and partly cools.

Simultaneously with J and K are

L. Plate is bored,

M. Plate is turned out of boring shell by driver bar 108.

Simultaneously with A, B and C of the next cycle the finished plate is delivered to the table 8.

The above operations A _____ M are all effected during one turn of the cam shaft 29.

For the purpose of clamping the matrix in position at the commencement of the run, the machine will be started to bring the shells 6 and 7 to the right hand end of their traverse.

The segments of the core, the casting and boring shells and other desired portions of the machine, may be cooled by a circulation of water or in other known ways.

The reciprocating motion may be imparted to the casting and boring shells by any appropriate mechanism other than that described and in general it will be understood that I do not confine myself to the particular details of construction and arrangement described and illustrated as it will be apparent that the same can be considerably modified without departing from the spirit of the invention.

The invention has been more particularly devised for producing semi-circular stereotype plates, but it will be evident that it can be employed for casting segmental stereotype plates of other than semicircular dimensions.

Although the primary aim of the invention is to produce a machine in which the whole of the operations involved in casting and finishing the plate are performed automatically, as is the case with the apparatus described and illustrated, yet it will be understood that some of the combinations of parts or devices claimed may be employed in machines designed to be operated partly or entirely by the attendant. In the present specification and claims, the word "finishing" in accordance with the usual practice severally includes the operations of boring and trimming its straight and curved edges.

What I claim and desire to secure by Letters Patent is:—

1. In apparatus for producing curved stereotype plates a casting shell and a boring shell in combination with a core said shells being adapted to be moved alternately into a coöperative position relatively to the core and said core being adapted to coact with the shells alternately in said position, to cast a plate in conjunction with the casting shell and to extract the plate therefrom and deliver it into the boring shell.

2. In apparatus for producing curved stereotype plates a casting shell and a boring shell in combination with a core and means for fixing a matrix in the casting shell, said shells being adapted to be moved alternately into a coöperative position relatively to the core, and said core being adapted to coact with shells alternately in said position to cast a plate in conjunction with the casting shell and to extract the plate therefrom and deliver it into the boring shell, and means for collapsing the core and causing the cast plate to bend inwards thereon to permit the core to strip the plate from the fixed matrix.

3. In apparatus for producing curved stereotype plates a casting shell and a boring shell in combination with a core said shells being adapted to be moved to and fro to bring them alternately into a coöperative position relatively to the core, and said core being adapted to coact with the shells alternately in said position to cast a plate in conjunction with the casting shell and to extract the plate therefrom and deliver it into the boring shell.

4. In apparatus for producing curved stereotype plates a casting shell and a boring shell in combination with a core, a slide whereon said shells can be moved to and fro to bring them alternately into a coöperative position relatively to the core, and means for causing said core to coact with the shells alternately in said position to cast a plate in conjunction with the casting shell and to extract the plate therefrom and deliver it into the boring shell.

5. In apparatus for producing curved stereotype plates a casting shell and a boring shell, in combination with a core and means for fixing a matrix in said casting shell, a slide whereon said shells can be moved to and fro to bring them alternately into a coöperative position relatively to the core, means for causing said core to coact with said shells alternately in said position to cast a plate in conjunction with the casting shell and to extract the plate therefrom and deliver it into the boring shell, means for collapsing the core and causing the cast plate to bend inwards thereon to permit the core to strip the plate from the fixed matrix.

6. In apparatus for producing curved stereotype plates, a casting shell and a boring shell in combination with a core, means whereby said shells can be moved to and fro together into positions in which they are alternately opposite the core, and means for causing said core to coact with said shells alternately in said position opposite the core, to cast a plate in conjunction with the casting shell and to extract the plate therefrom and deliver it into the boring shell.

7. In apparatus for producing curved stereotype plates a casting shell and a boring shell and finishing apparatus, means whereby said shells can be moved to and fro together into positions in which they are alternately in coöperative position relatively to the core and the boring shell is in operative position relatively to the finishing apparatus when the casting shell is in coöperative position relatively to the core, said core being adapted to coact with the shells alternately in their coöperative position relatively thereto to cast a plate in conjunction with the casting shell and to extract the plate therefrom and deliver it into the boring shell, and means for supplying molten metal between the core and casting shell when these are in coacting relation.

8. In apparatus for producing curved stereotype plates a casting shell and a boring shell in combination with a core a guide and means whereby said shells can be moved together to and fro thereon to bring them alternately into a coöperative position relatively to the core, said core being adapted to coact with said shells alternately in said position to cast a plate in conjunction with the casting shell and to extract the plate therefrom and deliver it into the boring shell, means for supplying molten metal between the core and casting shell when the same are in coacting relation, and a boring knife located in a position to coact with the boring shell to bore the plate therein when the shells are moved back to bring the casting shell into coöperative relation with the core.

9. In apparatus for producing curved stereotype plates the combination with a casting shell and a boring shell of a core and a rotary boring knife, a guide and means whereby said shells can be moved together thereon into positions in which they are alternately in position to coöperate with the core, and the boring shell is in position to coöperate with the boring knife, when the casting shell is in coöperative position with respect to the core, said core being adapted to coact with said shells alternately in their coöperative position with respect thereto, to cast a plate in conjunction with the casting shell and to extract the cast plate therefrom and deliver it into the boring shell, means for supplying molten metal between the core and casting shell when the same are in coacting relation and means for rotating the boring knife.

10. In apparatus for casting curved stereotype plates, the combination with a casting shell and a boring shell of a core and a rotary boring knife, a guide disposed parallel to said core and boring knife and whereon said shells are guided rectilinearly, means whereby said shells can be moved to and fro together on said slide into positions in which they are alternately opposite the core and the boring shell is opposite the boring knife when the casting shell is opposite the core, means for moving the core into coacting position with respect to the shells alternately, to cast a plate in conjunction with the casting shell and to extract the plate therefrom and deliver it into the boring shell, means for supplying molten metal between the core and casting shell when these are in coacting relation, and means for rotating the boring knife to bore the plate in the boring shell when this is opposite the boring knife.

11. In apparatus for casting curved stereotype plates, the combination with casting and boring shells adapted to be moved to and fro, of devices for fixing a matrix in the casting shell, a core adapted to coact with said shells alternately to cast a plate in conjunction with the casting shell and to extract the plate therefrom and deliver it into the boring shell, and means for bending the plate inwards on the core to allow the core to strip the plate from the fixed matrix.

12. In apparatus for casting curved stereotype plates, the combination with a casting shell and a boring shell of a core, a guide whereon said shells can be moved to and fro into positions in which they are alternately opposite the core, devices for fixing a matrix in the casting shell, means for causing the core to coact with said shells alternately to cast a plate in conjunction with the casting shell and to extract the plate therefrom and deliver it into the boring shell, means for bending the plate inwards on the core to allow the same to strip the plate from the fixed matrix, means for supplying molten metal between the core and casting shell when these are in coacting position and a boring knife opposite which the boring shell moves when the casting shell returns to position opposite the core, said knife being adapted to bore a plate in the casting shell.

13. In apparatus for producing curved stereotype plates, the combination with a casting shell and a boring shell and mechanism for intermittently reciprocating the same together, of a core adapted to coact with said shells alternately during the intermittences of their reciprocation to cast a plate in conjunction with the casting shell and to extract the plate therefrom and deliver it into the boring shell.

14. In apparatus for producing curved stereotype plates the combination with a casting shell and a boring shell and mechanism for intermittently reciprocating the same together, of a core adapted to coact with said shells alternately during the intermittences of their reciprocation, means for supplying molten metal between the core and casting shell when the same are stationary in coacting relation, means for moving the core with the cast plate thereon out of the casting shell and for moving it into the boring shell to deliver the cast plate thereinto in the corresponding intermittence of the reciprocation and for returning the core into coacting position relatively to the casting shell.

15. In apparatus for producing curved stereotype plates, a casting shell and a boring shell in combination with a core, mechanism for imparting reciprocation to said shells and arresting them in position alternately opposite said core, a device for fixing a matrix in the casting shell, means for moving the core into and out of coacting position with relation to said shells alternately, to cast a plate in conjunction with the casting shell and to extract the plate therefrom and deliver it into the boring shell, means for supplying molten metal between the core and casting shell when these are in coacting position, and means for bending the plate inwards on the core to allow the same to strip the plate from the fixed matrix.

16. In apparatus for producing curved stereotype plates, a casting shell and a boring shell in combination with a core, mechanism for intermittently reciprocating said shells into position alternately opposite said core, means alternately for moving the core into and out of coacting position with relation to the casting shell and into and out of the boring shell, means for supplying molten metal between the core and casting shell when these are stationary in coacting position, said core being adapted in its coacting motion with said shells alternately to extract the cast plate from the casting shell and deliver it into the boring shell, a boring knife opposite which the boring shell moves when the shells return to position to bring the casting shell opposite the core, and means for expelling the plate from the boring shell, said knife and expelling means being adapted to act on the plate before the boring shell returns to position opposite the core.

17. In apparatus for producing curved stereotype plates, a casting shell and a boring shell in combination with a core and finishing apparatus, a guide whereon said shells can be moved to and fro into positions of rest in which they are alternately opposite said core and the boring shell is alternately opposite the finishing apparatus, means for alternately moving the core into and out of coacting position relatively to the casting shell and into and out of the boring shell, means for supplying molten metal between the core and casting shell when these are stationary in coacting position, said core being adapted in its coacting position with said shells alternately to extract the cast plate from the casting shell and deliver it into the boring shell, and means for subjecting the cast plate to the action of the finishing apparatus before the boring shell returns to coacting position relatively to the core.

18. In apparatus for producing curved stereotype plates, a casting shell and a boring shell in combination with a core, mechanism for intermittently reciprocating said shells into positions of rest in which they are alternately opposite said core and the boring shell is alternately opposite finishing mechanism, said finishing mechanism, means for alternately moving the core into and out of coacting position with relation to the casting shell and into and out of the boring shell, means for supplying molten metal between the core and casting shell when these are stationary in coacting position, said core being adapted in its coacting motion with said shells alternately to extract the cast plate from the casting shell and deliver it into the boring shell, means for causing the plate to coact with said finishing mechanism and for expelling the plate from the boring shell before the same returns to position opposite the core and while the casting shell and core are in coacting relation, whereby consecutive plates can be subjected to a finishing operation and cast simultaneously.

19. In apparatus for producing curved stereotype plates a casting shell and a boring shell in combination with a core and boring mechanism, said shells being adapted to reciprocate parallel to the core and boring mechanism and to stop alternately opposite the core and with the boring shell opposite the boring mechanism when the casting shell is opposite the core, means for imparting such intermittent reciprocation to the shells, means for alternately moving the core into and out of coacting position with relation to the casting shell and into and out of the boring shell, means for supplying molten metal between the core and casting shell when same are stationary in coacting position, said core being adapted in its coacting motion with said shells alternately to extract the cast plate from the casting shell and deliver it into the boring shell, means for operating the boring mechanism to bore the plate in the boring shell and means for expelling the plate from the boring shell, said boring mechanism and expelling means operating on the plate before the boring shell returns to position opposite the core and while the casting shell and core are in coacting relation.

20. In apparatus for producing curved stereotype plates, a casting shell and a boring shell in combination with a core, and a rotary boring knife, mechanism for intermittently reciprocating said shells parallel to said core into positions of rest in which they are alternately opposite the core and the boring shell is under the boring knife when the casting shell is opposite the core, means for alternately moving the core into and out of coacting position with relation to the casting shell and into and out of the boring shell, means for supplying molten metal between the core and casting shell when same are stationary in coacting position, said core being adapted in its coacting motion with said shells alternately to extract the cast plate from the casting shell and deliver it into the boring shell, means for rotating the boring knife to bore the plate in the boring shell, and means for rotating the plate out of the boring shell to expel it therefrom and trimmers located in position to act on the curved edges of the plate and trim the same during said rotation of the plate, said boring knife and expelling means being adapted to act on the plate in the corresponding position of rest of the shells, whereby consecutive plates can be finished and cast simultaneously.

21. In apparatus for producing curved stereotype plates, a casting shell and a boring shell in combination with a core and a rotary boring knife, a slide disposed parallel to said core and boring knife and extending below the knife, mechanism for intermittently reciprocating said shells together into positions of rest in which they are alternately opposite the core with the boring shell below the knife when the casting shell is opposite the core, means for alternately moving the core into and out of coacting position with relation to the casting shell and into and out of the boring shell, means for supplying molten metal between the core and casting shell when same are stationary in coacting position, said core being adapted in its coacting motion with said shells alternately to extract the cast plate from the casting shell, and deliver it into the boring shell, cutters disposed above the path of the boring shell and adapted to trim the straight edges of the plate in the traverse of the boring shell towards the boring knife, means for rotating the boring knife to cause the same to bore the plate in the boring shell when this is below the knife, means for rotating the plate out of the boring shell to expel it therefrom, and trimmers adapted to trim the curved edges of the plate during said rotation thereof, said boring knife and expelling means being adapted to act on the plate while the boring and casting shells are stationary opposite the finishing mechanism and the core respectively, whereby consecutive plates can be finished and cast simultaneously.

22. In apparatus for producing curved stereotype plates, a casting shell and a boring shell, in combination with a core and a rotary boring and delivery cylinder, a boring knife and a retractable expeller on said cylinder, a slide disposed parallel to the said core and cylinder and extending below the cylinder, mechanism for intermittently reciprocating the shells together into positions of rest in which they are alternately opposite the core with the boring shell below the said cylinder when the casting shell is opposite the core, means for alternately moving the core into and out of coacting position with relation to the casting shell and into and out of the boring shell, means for supplying molten metal between the core and casting shell when same are stationary in casting position, said core being adapted in its coacting motion with said shells alternately to extract the cast plate from the casting shell and deliver it into the boring shell, means for rotating the boring and delivery cylinder, whereby the boring knife and expeller are successively brought into coacting relation with the plate in the boring shell, means for retracting the expeller during the travel of the boring shell to boring position and for projecting it after the boring into position to engage the plate and rotate it out of the boring shell, said boring knife and expeller being adapted to act on the plate while the boring shell is stationary under said cylinder and the casting shell is stationary opposite the core, substantially as described.

23. In apparatus for producing curved stereotype plates the combination with a collapsible core of a casting shell and a boring shell adapted to be moved to and fro into positions of rest in which they are alternately opposite said core, devices for fixing a matrix in said casting shell, means for moving said core alternately into and out of coacting position with respect to the casting shell and into and out of the boring shell to coact with said shells alternately in their stationary position opposite the core, means for supplying metal between the core and casting shell when these are stationary in coacting position, means for retaining the cast plate on the core until same moves into the boring shell, means for collapsing the core before it moves out of the casting shell and for expanding it prior to the casting of the next plate, means for retaining the plate on the core until same moves into the boring shell and for causing the plate to bend inwards with the collapsed core so as to strip thereon from the fixed matrix, and means for separating the cast plate from the core when same moves into the boring shell, to allow the core to deposit the plate thereinto.

24. In apparatus for producing curved stereotype plates, a casting shell and a boring shell, in combination with a core, means for fixing a matrix in the casting shell, means for reciprocating said shells parallel to said core and arresting them alternately opposite the same, means for moving said core alternately into and out of coacting position with respect to the casting shell and into and out of the boring shell to coact with said shells alternately in their stationary position opposite the core, means for supplying metal between the core and casting shell when these are stationary in coacting position, means for retaining the cast plate on the core until the same moves into the boring shell, means for bending the cast plate inwards on the core to enable it to strip with the core from the fixed matrix and means for separating the plate from the core when same moves into the boring shell to allow the core to deposit the plate thereinto.

25. In apparatus for producing curved stereotype plates, a casting shell and a boring shell in combination with a collapsible core, means for fixing a matrix in the casting shell, means for reciprocating said shells parallel to said core and arresting them alternately opposite the same means for moving said core alternately into and out of coacting position with respect to the casting shell and into and out of the boring shell to coact with said shells alternately in their stationary position opposite the core, means for supplying metal between the core and casting shell when these are stationary in coacting position, means for collapsing the core before it moves out of the casting shell and for expanding it prior to the casting of the next plate, means for retaining the cast plate on the core until the same moves into the boring shell and for causing the plate to bend inwards on the collapsed core so as to strip thereon from the fixed matrix and means for separating the plate from the core when same moves into the boring shell, to allow the core to deposit the plate thereinto.

26. In apparatus for producing curved stereotype plates, a casting shell and a boring shell in combination with a collapsible core, devices for fixing a matrix in the casting shell, means for reciprocating said shells relatively to said core and arresting them alternately opposite the same, mechanism for moving said core alternately into and out of coacting position with respect to the casting shell and into and out of the boring shell to coact with said shells alternately in their stationary position opposite the core, means for supplying metal between the core and casting shell when they are stationary in coacting position, means for retaining the cast plate on the core until the same moves into the boring shell, means for collapsing the core before it moves out of the casting shell and for causing the plate to follow the collapsing and expanding motions of the core so as to strip with the core from the fixed matrix and to expand on the core and means for separating the cast plate from the core when same moves into the boring shell, to allow the core to deposit the plate thereinto.

27. In apparatus for producing curved stereotype plates, a collapsible core in combination with a casting shell and a boring shell disposed end to end, a slide parallel to said core, and means for reciprocating said shells together thereon and for arresting them alternately opposite the core, rocking arms supporting said core and whereon the same can be swung in a circular arc alternately into and out of coacting position with respect to the casting shell and into and out of the boring shell to coact with said shells alternately in their stationary position opposite the core, means for supplying metal between the core and casting shell when they are stationary in coacting position, mechanism for collapsing the core before it moves out of the casting shell and for expanding it prior to the casting of the next plate, means for retaining the cast plate on the core until same swings into the boring shell and for causing the plate to follow the collapsing motion of the core and strip thereon from the fixed matrix and means for separating the cast plate from the core when same moves into the boring shell, to allow the core to deposit the plate thereinto.

28. In apparatus for producing curved stereotype plates, a casting shell and a boring shell in combination with a core and finishing apparatus, devices for fixing a matrix in said casting shell, mechanism for reciprocating said shells together relatively to said core and finishing apparatus and arresting them in positions in which they are alternately in coöperative position relatively to said core and the boring shell is alternately in coöperative position relatively to the finishing apparatus means for moving the core alternately into and out of casting position relatively to the casting shell and into and out of the boring shell to coact with said shells alternately in their stationary coöperative position with respect to the core, means for supplying metal between the core and casting shell when they are stationary in casting position, means for retaining the cast plate on the core until same moves into the boring shell, means for bending the cast plate inwards on the core to enable it to strip therewith from the fixed matrix, means for separating the plate from the core when same moves into the boring shell to allow the core to deposit the plate thereinto and means for subjecting the cast plate to the action of the finishing apparatus before the boring shell returns to coacting position relatively to the core.

29. In apparatus for producing curved stereotype plates, a casting shell and a boring shell in combination with a collapsible core and a rotary boring knife, devices for fixing a matrix in the casting shell, a slide wherein said casting and boring shell can be reciprocated relatively to said core and boring knife, and means for so reciprocating said shells and arresting them in positions in which they are alternately opposite the core and the boring shell is alternately opposite the boring knife, means for moving the core alternately into and out of casting position relatively to the casting shell and into and out of the boring shell to coact with said shells alternately in their stationary coöperative position with respect to the core, means for supplying metal between the core and casting shell when same are stationary in casting position, means for retaining the cast plate on the core until same moves into the boring shell mechanism for collapsing the core before it moves out of the casting shell and for expanding it prior to the casting of the next plate, means for causing the plate to bend inwards on the collapsed core so as to strip therewith from the fixed matrix, means for separating the cast plate from the core when same moves into the boring shell, to allow the core to deposit the plate thereinto, and mechanism whereby said boring knife is caused to act on the plate in the boring shell before the boring shell returns to position opposite the core.

30. In apparatus for producing curved stereotype plates a collapsible core in combination with a casting shell and a boring shell, and a rotary boring and delivery cylinder devices for fixing a matrix on the casting shell, mechanism for reciprocating said casting and boring shells together parallel to said core and cylinder and for arresting them in positions in which they are alternately opposite the core and the boring cylinder is alternately opposite and in coacting relation with the boring and delivery cylinder, mechanism for moving the core alternately into and out of casting position relatively to the casting shell and into and out of the boring shell to coact with said shells alternately in their respective stationary position opposite the core, means for supplying metal between the core and casting shell when same are stationary in casting position, means for retaining the cast plate on the core until same moves into the boring shell mechanism for collapsing the core before it moves out of the casting shell and for expanding it prior to the casting of the next plate, means for causing the plate to bend inwards on the collapsed core so as to strip therewith from the fixed matrix, means for separating the cast plate from the core when same moves into the boring shell, to allow the core to deposit the plate thereinto, mechanism for rotating the boring and delivery cylinder and a boring knife and an expeller on said cylinder adapted to act in turn on the plate in the boring cylinder to successively bore the plate and rotate it out of the boring shell before the same begins to return to position opposite the core.

31. In apparatus for producing curved stereotype plates, a collapsible core in combination with a casting shell and a boring shell, and a rotary boring and delivery cylinder, devices for fixing a matrix on the casting shell, mechanism for reciprocating said casting and boring shells together parallel to said core and cylinder and for arresting them in positions in which they are alternately opposite the core and the boring cylinder is alternately opposite and in coacting relation with the boring and delivery cylinder, mechanism for moving the core alternately into and out of casting position relatively to the casting shell and into and out of the boring shell to coact with said shells alternately in their respective stationary positions opposite the core, means for supplying metal between the core and casting shell when same are stationary in casting position, means for retaining the cast plate on the core until same moves into the boring shell, mechanism for collapsing the core before it moves out of the casting shell and for expanding it prior to the casting of the next plate means for causing the plate to bend inwards on the collapsed core so as to strip therewith from the fixed matrix, means for separating the cast plate from the core when same moves into the boring shell, to allow the core to deposit the plate thereinto, mechanism for rotating the boring and delivery cylinder and a boring knife and an expeller on said cylinder adapted to act in turn on the plate in the boring cylinder to successively bore the plate and rotate it out of the boring shell before the same begins to return to position opposite the core and trimmers located to act upon the curved edges of the plate in said rotation thereof whereby the said edges are trimmed during the expulsion of the plate from the boring shell.

32. In apparatus for producing curved stereotype plates a casting shell and a boring shell in combination with a core and finishing and delivery apparatus, mechanism for reciprocating said shells together and arresting them in positions in which they are alternately opposite the core and the boring shell is opposite and in coacting relation with the finishing and delivery apparatus when the casting shell is opposite the core, means for causing said core to coact with shells alternately in the respective position opposite same to cast a plate in conjunction with the casting shell and to extract the plate therefrom and deliver it into the boring shell, means for causing the finishing and delivery apparatus to act on the plate in the boring shell when this is opposite the same and the casting shell opposite the core, and means for supplying metal between the core and casting shell when same are in coacting relation in the period comprised by the finishing and delivery of the previously cast plate.

33. In apparatus for producing curved stereotype plates, a casting shell and a boring shell in combination with a core and a boring and delivery cylinder, mechanism for reciprocating said shells together and arresting them in positions in which they are alternately opposite the core and the boring shell is opposite and in coacting relation with the boring and delivery cylinder when the casting shell is opposite the core, means for moving said core alternately into and out of coacting position with respect to the casting shell and into and out of the boring shell to coact with said shells alternately in their respective stationary position opposite the core, said core being adapted in its coaction with the shells to cast a plate in conjunction with the casting shell and to extract the cast plate therefrom and deliver it into the boring shell, mechanism for rotating the boring and delivery cylinder, and a boring knife and an expeller on said cylinder adapted to act in turn on the plate in the boring shell when this is opposite the cylinder and the casting shell opposite the core and means for supplying metal between the core and casting shell when same are in coacting relation in the period, comprised by the boring and delivery, of the previously cast plate.

34. In a machine for producing curved stereotype plates, a casting shell and a boring shell in combination with a core and finishing and delivery apparatus, mechanism for reciprocating said shells together and arresting them in positions in which they are alternately opposite the core and the boring shell is opposite and in coacting relation with the finishing and delivery apparatus when the casting shell is opposite the core, mechanism for moving said core alternately into and out of coacting position with respect to the casting shell and into and out of the boring shell to coact with said shells alternately in their respective stationary position opposite the core, said core being adapted in its coaction with the shells to cast a plate in conjunction with the casting shell and to extract the cast plate therefrom and deliver it into the boring shell, means for causing the finishing and delivery apparatus to act on the plate in the boring shell when this is opposite the same and the casting shell opposite the core, means for supplying metal between the core and casting shell when same are in coacting relation in the period comprised by the finishing and delivery of the previously cast plate and mechanism for automatically stopping the machine when the metal has thus been supplied to the mold to cast a new plate and the preceding plate has been finished and delivered.

35. In a machine for producing curved stereotype plates a casting shell and a boring shell, in combination with a core, means for moving said core alternately into and out of coacting position relatively to the casting shell and into and out of the boring shell, said core being adapted in its coaction with said shells to cast a plate in conjunction with the casting shell and to extract the cast plate therefrom and deliver it into the boring shell, a movable member on said core and means for forcing the said member against the jet of the cast plate when the core delivers same into the boring shell and thereby breaking off the jet over a longitudinal edge of the boring shell.

36. In a machine for producing curved stereotype plates, a casting shell and a boring shell in combination with a core, means for reciprocating said shells relatively to the core and arresting them alternately in a position opposite the same, means for moving said core alternately into and out of the coacting position relatively to the casting shell and into and out of the boring shell to coact with said shells alternately in their respective stationary position opposite the core, said core being adapted in its coaction with the shells to cast a plate in conjunction with the casting shell and to extract the cast plate therefrom, and deliver it into the boring shell, a sliding mouth piece component on the core and means for sliding said component forward on the core against the jet of the cast plate when the core delivers same into the boring shell and thereby breaking off the jet over a longitudinal edge of the boring shell.

37. In a machine for producing curved stereotype plates, a core in combination with a casting shell and a boring shell disposed in alinement, a slide parallel to and extending below said core and mechanism for reciprocating said shells together horizontally thereon and for arresting them in positions in which they are alternately below the core, means for rocking the core alternately into and out of coacting position relatively to the casting shell and into and out of the boring shell to coact with said shells alternately in their respective stationary position below the core, said core being adapted in its coaction with the shells to cast a plate in conjunction with the casting shell and to extract the cast plate therefrom and deliver it into the boring shell, a sliding mouthpiece component on the core, a sharp horizontal edge at top of the boring shell adapted to coact with said component, and mechanism for automatically sliding said component forward on the core against the jet of the cast plate when the core delivers same into the boring shell and thereby breaking off the jet over said horizontal edge substantially as described.

38. In a machine for producing curved stereotype plates, a casting shell and a boring shell disposed in alinement, in combination with a collapsible core, devices for fixing a matrix in the casting shell, a slide and mechanism for reciprocating said shells together thereon and arresting them at the end of each oscillation in positions in which they are alternately opposite the core, a metal pump and a discharge conduit therefrom located to discharge into the casting shell when same is opposite the core, a cam shaft parallel to said slide, arms supporting said core, and appertaining mechanism for operating said core arms to move the core alternately into and out of coacting position relatively to the coacting shell and into and out of the boring shell to coact with said shells alternately in their respective stationary positions opposite the core, a cam and appertaining mechanism for operating the pump and thereby supplying metal between the core and casting shell when same are in casting position, a cam and appertaining mechanism for collapsing the core before the same moves out of the casting shell and for expanding it preparatory to the next cast, means for causing the cast plate to bend inwards on the collapsed core to strip therewith from the fixed matrix and for retaining the cast plate on the core until the same moves into the boring shell, means for closing the bottom of the casting space when the core and casting shell are in casting relation, and for stripping the cast plate from the core into the boring shell when the core moves thereinto, a sliding member on said core, and an edge on the boring shell coacting therewith, a cam and mechanism for sliding said member forward on the core against the jet of the plate when the core delivers same into the boring shell and thereby breaking off the jet over said edge, a boring knife located in position to bore the plate in the boring shell when the same slides to its position away from the core and means for retaining the plate in the boring shell during the boring operation, said cams being all mounted on the said cam shaft.

39. In a machine for producing curved stereotype plates, a casting shell and a boring shell disposed in alinement, in combination with a collapsible core, devices for fixing a matrix in the casting shell, a slide and mechanism for reciprocating said shells together thereon and arresting them at the end of each oscillation in positions in which they are alternately opposite the core, a metal pump and a discharge conduit therefrom located to discharge into the casting shell when same is opposite the core, a rotary boring and delivery cylinder located in position to coact with the boring shell in its position of rest away from the core, a cam shaft parallel to the slide arms supporting said core, cams and appertaining mechanism for operating said core arms to move the core alternately into and out of coacting position relatively to the casting shell and into and out of the boring shell to coact with said shells alternately in their respective position of rest opposite the core, a cam and appertaining mechanism for operating the pump and thereby supplying metal between the core and casting shell when same are in casting position, a cam and appertaining mechanism for collapsing the core before it moves out of the casting shell and for expanding it preparatory to the next cast, means for causing the cast plate to bend inwards on the collapsed core so as to strip therewith from the fixed matrix and for retaining the cast plate on the core until the same moves into the boring shell, means for closing the casting space when the core and casting shell are in casting relation and for stripping the cast plate from the core into the boring shell when the core moves thereinto, a sliding mouthpiece component on said core and an edge on the boring shell coacting therewith, a cam and mechanism for sliding said component forward on the core against the jet of the plate when the core delivers same into the boring shell and thereby breaking off the jet over said edge, a boring knife and an expeller on said boring cylinder and means for operating said cylinder to cause the knife and expeller to successively and respectively bore the plate in the boring shell and expel it therefrom while the boring shell is stationary opposite the said cylinder, and means for retaining the plate in the boring shell during the boring, said cams being all mounted on said cam shaft, and the core actuating and pump controlling cams being co-related with the shell reciprocating mechanism to cast a plate while the preceding plate is subject to the action of the boring and delivery cylinder.

40. In a machine for producing curved stereotype plates, a casting shell and a boring shell disposed in alinement in combination with a collapsible core, devices for fixing a matrix in the casting shell, a slide and mechanism for reciprocating said shells together horizontally thereon and arresting them at the end of each oscillation in position in which they are alternately opposite the core, a metal pump and a discharge conduit therefrom located to discharge into the casting shell when same is opposite the core, a horizontal boring and delivery cylinder located above the slide in position to coincide above and coact with the boring shell in its position of rest away from the core, a cam shaft parallel with the slide, arms supporting said core-cams and appertaining mechanism for operating said core arms to move the core alternately into and out of coacting position relatively to the casting shell and into and out of the boring shell to coact with said shells alternately in their respective position of rest opposite the core, a cam and appertaining mechanism for operating the pump and thereby supplying metal between the core and casting shell when same are in casting position, a cam and appertaining mechanism for collapsing the core before it moves out of the casting shell and for expanding it preparatory to the next cast, means for causing the cast plate to bend inwards on the collapsed core so as to strip therewith from the fixed matrix and for retaining the cast plate on the core until same moves into the boring shell, a stopper bar for closing the bottom of the casting space when the core and casting shell are in casting relation and for stripping the plate from the core into the boring shell when the core moves thereinto, a cam and appertaining mechanism for correspondingly moving said stopper bar into and out of position relatively to the casting and boring shells, a sliding mouth piece component on said core and an upper horizontal edge on the boring shell coacting therewith, a cam and mechanism for sliding said component forward on the core against the jet of the plate when the core delivers same into the boring shell and thereby breaking off the jet over said edge, a boring knife and an expeller on said boring cylinder and means for operating said cylinder to cause the knife and expeller to successively and respectively bore the plate in the boring shell and rotate it out of same while the boring shell is stationary under the cylinder, a stopper bar adapted to engage the bottom of the plate in the boring shell and retain the same therein during boring, a cam and appertaining mechanism for moving said stopper bar into and out of engagement with the plate to retain it during the boring and to release it for expulsion, said cams being all mounted on said cam shaft and the core manipulating and pump operating cams being co-related with the shell reciprocating mechanism to cast a plate while the preceding plate is subject to the action of the boring and delivery cylinder.

41. In a machine for producing curved stereotype plates, a casting shell and a boring shell disposed in alinement, in combination with a collapsible core, devices for fixing a matrix in the casting shell, a slide and mechanism for reciprocating said shells together thereon and arresting them at the end of each oscillation in positions in which they are alternately opposite the core, a metal pump and a discharge conduit therefrom located to discharge into the casting shell when same is opposite the core, a rotary boring and delivery cylinder located in position to coact with the boring shell in its position of rest away from the core, a cam shaft parallel to the slide arms supporting said core, cams and appertaining mechanism for operating said core arms to move the core alternately into and out of coacting position relatively to the casting shell and into and out of the boring shell to coact with said shells alternately in their respective position of rest opposite the core, a cam and appertaining mechanism for operating the pump and thereby supplying metal between the core and casting shell when same are in casting position, a cam and appertaining mechanism for collapsing the core before it moves out of the casting shell and for expanding it preparatory to the next cast, means for causing the cast plate to bend inwards on the collapsed core so as to strip therewith from the fixed matrix and for retaining the cast plate on the core until the same moves into the boring shell, means for closing the casting space when the core and casting shell are in casting relation and for stripping the cast plate from the core into the boring shell when the core moves thereinto, a sliding mouthpiece component on said core and an edge on the boring shell coacting therewith, a cam and mechanism for sliding said component forward on the core against the jet of the plate when the core delivers same into the boring shell and thereby breaking off the jet over said edge, a boring knife and an expeller on said boring cylinder and means for operating said cylinder to cause the knife and expeller to successively and respectively bore the plate in the boring shell and expel it therefrom while the boring shell is stationary opposite the said cylinder, and means for retaining the plate in the boring shell during the boring, said cams being all mounted on said cam shaft, and the core actuating and pump controlling cams being co-related with the shell reciprocating mechanism to cast a plate while the preceding plate is subject to the action of the boring and delivery cylinder, and mechanism for automatically stopping the machine when the said plates have been respectively expelled and cast, substantially as described.

42. In a machine for producing curved stereotype plates, a casting shell and a boring shell disposed in alinement in combination with a collapsible core, devices for fixing a matrix in the casting shell, a slide and mechanism for reciprocating said shells together horizontally thereon and arresting them at the end of each oscillation in positions in which they are alternately opposite the core, a metal pump and a discharge conduit therefrom located to discharge into the casting shell when same is opposite the core, a horizontal boring and delivery cylinder located above the slide in position to coincide above and coact with the boring shell in its position of rest away from the core, a cam shaft parallel with the slide, arms supporting said core, cams and appertaining mechanism for operating said core arms to move the core alternately into and out of coacting position relatively to the casting shell and into and out of the boring shell to coact with said shells alternately in their respective position of rest opposite the core, a cam and appertaining mechanism for operating the pump and thereby supplying metal between the core and casting shell when same are in casting position, a cam and appertaining mechanism for collapsing the core before it moves out of the casting shell and for expanding it preparatory to the next cast, means for causing the cast plate to bend inwards on the collapsed core so as to strip therewith from the fixed matrix and for retaining the cast plate on the core until same moves into the boring shell, a stopper bar for closing the bottom of the casting space when the core and casting shell are in casting relation and for stripping the plate from the core into the boring shell when the core moves thereinto, a cam and appertaining mechanism for correspondingly moving said stopper bar into and out of position relatively to the casting and boring shells, a sliding mouthpiece component on said core and an upper horizontal edge on the boring shell coacting therewith, a cam and mechanism for sliding said component forward on the core against the jet of the plate when the core delivers same into the boring shell and thereby breaking off the jet over said edge, a boring knife and a retractable expeller on said boring cylinder, mechanism for rotating said boring cylinder to cause the knife and expeller to successively and respectively bore the plate in the boring shell and rotate it out of same while the boring shell is stationary under the cylinder, a cam and appertaining mechanism for retracting the expeller to clear the cast plate as the boring shell slides to position under the cylinder and for thereafter projecting the expeller into position to engage the plate, a stopper bar adapted to engage the bottom of the plate in the boring shell and retain the same therein during boring, a cam and appertaining mechanism for moving said stopper bar into and out of engagement with the plate to retain it during the boring and to release it for expulsion, said stopper bar operating cams being adapted to keep the stopper bars in position to retain the plate in the boring shell during its travel to position under the boring and delivery cylinder, all the cams being mounted on the said cam shaft and the core manipulating and pump operating cams being correlated with the shell reciprocating mechanism to cast a plate while the preceding plate is subject to the action of the boring and delivery cylinder, substantially as described.

43. In apparatus for producing curved stereotype plates, the combination of a casting shell, a boring shell, and a core, with means for effecting a relative reciprocation of such parts, so that the core is adapted to coact alternately with the casting shell and the boring shell.

44. In apparatus for producing curved stereotype plates, the combination of a casting shell, a boring shell, and a core, said casting shell and boring shell being arranged in front of said core, with means for effecting a relative reciprocating of the core and the casting and boring shells, so that the core is adapted to co-act with said shells alternately.

45. In apparatus for producing curved stereotype plates, the combination of a casting shell, a boring shell, and a core, with means for effecting a relative reciprocation of said core and said casting and boring shells, so that the core is adapted to co-act with said shells alternately, and said core being adapted to extract the plate from the casting shell and deliver it into the boring shell.

In witness whereof I have hereunto signed my name in the presence of two subscribing witnesses.

ROBERT CUMMING ANNAND.

Witnesses:
 ROBERT MILTON SPEARPOINT,
 THOMAS LAING WHITEHEAD.